Patented Sept. 14, 1954

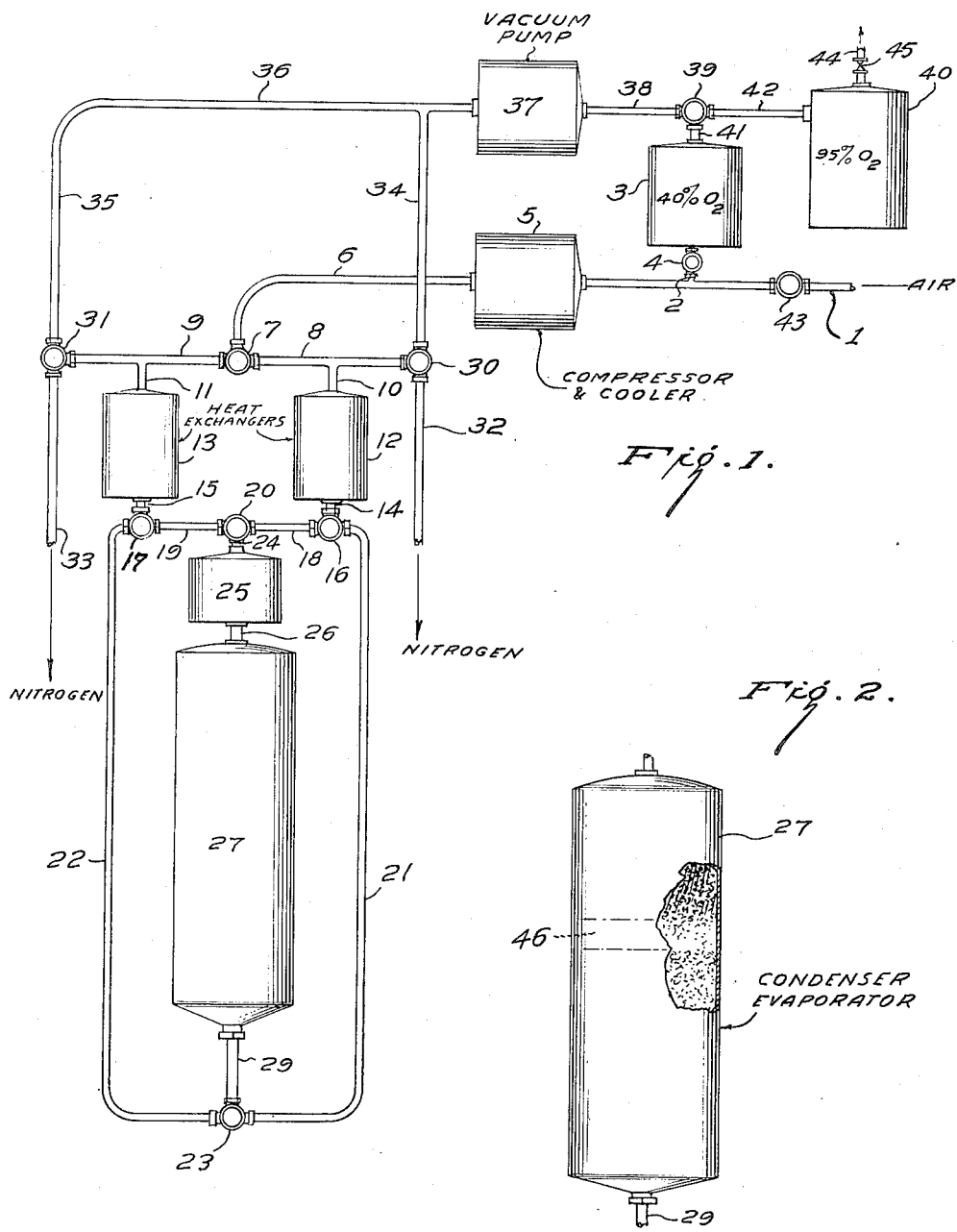

2,688,854

UNITED STATES PATENT OFFICE 2,688,854

PROCESS AND APPARATUS FOR THE SEPARATION OF OXYGEN FROM AIR

Louis N. Allen, Jr., Short Hills, N. J., assignor to Chemical Construction Corporation, New York, N. Y., a corporation of Delaware Application March 26, 1952, Serial No. 278,669

13 Claims. (Cl. 62—123)

This invention relates to the separation of oxygen from air by fractional condensation and evaporation and more particularly to an improved, highly efficient and inexpensive process and apparatus for effecting such separation. According to the invention, air which may or may not be enriched in oxygen content is pre-cooled to the temperature of incipient condensation and passed over a heat exchange medium of extended surface area and low heat capacity which in turn has been pre-cooled to a temperature just above the boiling point of nitrogen. On initial contact there results a zone in which there occurs an immediate condensation of a thin film mixture of liquid nitrogen and oxygen with only nearly pure nitrogen gas passing forward. Since the heat capacity of the exchange medium is low, continued delivery of the air results, almost immediately, in the film arriving at a uniform composition in equilibrium with the air. As this occurs, the zone of condensation moves forward in the direction of flow of the air until substantially the entire surface of the medium is coated with the thin film of liquid. During this time all the oxygen in the air will be condensed and only substantially pure, gaseous nitrogen passed on. Delivery of air is then discontinued and the film of liquid which contains a maximum proportion of oxygen in equilibrium with the oxygen in the air is subjected to evaporation at reduced pressure. Under these conditions the first portion of gas to be evaporated is a mixture of nitrogen and oxygen, of the approximate composition of the air. The film may be completely evaporated and collected to give a gas containing approximately 50% oxygen. If a 95% oxygen containing gas is desired the oxygen content of the air going to the process may be advantageously increased or enriched to about 26%. Under these conditions the gas resulting from evaporation of the film may be collected in two fractions, a first fraction averaging about 40% oxygen, which may be recycled to enrich the air to be processed, and a second fraction, containing about 55% of the oxygen liquefied, averaging 95% oxygen.

Probably, the first practical process for quantity production of commercially pure oxygen from air was invented by Linde in 1902. This process produced oxygen of from 98–99% purity, but the separated nitrogen contained over 7% oxygen. Later, in 1903 Claude developed a process which enabled the production of practically pure nitrogen and oxygen from air. Essentially, Claude's process differed from Linde's in that Claude fractionally condensed the air to obtain two liquids, one rich in oxygen and the other rich in nitrogen. These were subsequently rectified to produce the nearly pure nitrogen and oxygen obtained by his process.

While there have been many improvements in the above processes since their inception, basically their principle of operation remains the same. Both are characterized in that all of the air treated is liquified. Since the quantity of nitrogen in air represents about 4/5 of its volume and it is in many instances simply discarded as waste, there exists a substantial loss in available energy to effect the transfer of heat in the practice of these processes which, in turn, results in a high consumption of energy for low level refrigeration. I have discovered that this loss may be considerably reduced by operating in a particular way with particular apparatus and it is an object of the present invention to provide such an improved process and apparatus.

The invention further comprises the separation of oxygen from air with as little liquifaction of nitrogen as possible, thereby effecting a substantial savings in power costs, cost of equipment, and maintenance. In addition to the production of commercially pure oxygen, there is also produced a fraction of nearly pure nitrogen which may be recovered and used commercially, if desired. The present invention includes among its objects a novel assemblage and arrangement of apparatus including heat exchangers and a condenser-evaporator, such that efficient transfer and use of heat is obtained between the relatively warm air to be processed and the cold products resulting from the separation. Once the process is started the only additional energy necessary for continuous operation is that required in the form of gas pressure to force the gases through the apparatus, to effect the low level refrigeration and make up for unavoidable heat transfer loss or leakage, and that necessary, as power, to drive the vacuum pump effecting evaporation of the gases mentioned above. Other objects and advantages more or less ancillary to the foregoing, and the manner in which they are attained, will become apparent from the following detailed description of a preferred embodiment of the invention for producing 95% pure oxygen gas, reference being made to the accompanying drawings in which:

Figure 1 is a diagrammatic view showing the arrangement of apparatus for carrying out the process, and Figure 2 is a detailed sectional view of the condenser-evaporator at one stage of operation.

Referring to the drawings, atmospheric air enters pipe 1 and is enriched in oxygen at 2 by admixture with a controlled amount of a mixture of approximately 40% oxygen and 60% nitrogen gas from gas holder 3 by means of valve 4. This oxygen-nitrogen mixture is obtained as a fraction during operation of the process in a manner presently described, and by admixture with the incoming air, is simply recycled to the process. For best results, the air is enriched to contain approximately 26% oxygen, the remainder being roughly 73% nitrogen and about 1% argon, etc. The enriched air is compressed and cooled at 5 in a manner well known in the art, and water vapor and carbon dioxide are removed by conventional means forming no part of the present invention and therefore not shown. Leaving the compressor and cooler, at a temperature of about 32° C., the gas under a suitable pressure of from 1.3–5 atmospheres is discharged through pipe 6 to a two-way valve 7 by means of which it may be discharged into either pipes 8 or 9. Pipes 10 and 11 connect pipes 8 and 9 respectively with heat exchangers 12 and 13. The heat exchangers, which are of useful construction, consist of relatively large, elongated cylinders or tanks of substantially equal exchange capacity and heat insulated on the outside. For purposes of illustration, the exchangers are shown in the drawing considerably reduced in size as compared with the size of the condenser-evaporator to be described but it is to be understood that in practice they may be of about the same size as the condenser-evaporator, or larger. In use, the exchangers operate alternately, that is, during the first half-cycle of operation, one exchanger is cooling the incoming enriched air while the other is being cooled by the outgoing products of separation, and during the second half-cycle the operation of the exchangers is reversed. The heat exchangers are provided with pipes 14 and 15 respectively which connect with two-way valves 16 and 17 for connection in turn with either pipes 18 and 19 leading to two-way valve 20 or with pipes 21 and 22 leading to two-way valve 23. Connected to valve 20 by means of pipe 24 is an expansion engine or turbine 25 which discharges through pipe 26 into a combined condenser and evaporator 27.

The condenser-evaporator consists of a large, elongated tank or cylinder provided internally with heat-exchange packing material of low heat capacity per unit of surface area and of extended surface area. Advantageously, the packing may consist of non-corrosive, thin metallic foil, woven wire mesh or coarse, stainless steel wool. Its purpose as will be more fully explained, is to provide an extended surface for the condensation and retention of a film of liquid oxygen and nitrogen in the condenser-evaporator and for this reason it is best that it arrive at equilibrium temperature with the incoming gas substantially simultaneously with the formation of the film. The opposite end of the condenser-evaporator is provided with discharge pipe 29 which connects with two-way valve 23 as shown.

Pipes 8 and 9 as shown, are provided with extensions leading to two-way valves 30 and 31 respectively. Depending on the positions of these valves they may deliver a nearly pure nitrogen gas through outlet discharge pipes 32 and 33 respectively, or connect through pipes 34 and 35 to a header pipe 36 leading to a vacuum pump 37. The vacuum pump is arranged to discharge through pipe 38 to two-way valve 39 which in turn may deliver gas from pipe 38 into either reservoir 3 or storage tank 40 through pipes 41 or 42 respectively. Reservoir 40 is provided to receive the commercially pure oxygen gas product, produced during the process and averaging approximately 95% oxygen. Oxygen may be withdrawn from 40 by means of pipe 44 and valve 45 for use as desired.

As stated, the process is best operated in connection with air enriched to contain about 26% oxygen for the reason that at this concentration, and at a temperature of −189.8° C., it will be in equilibrium with liquid air containing a maximum amount of oxygen, namely about 60% oxygen. In beginning operation, the packing in one or the other of the heat exchangers 12 or 13 is pre-cooled to about −183° C. and the packing in the condenser-evaporator 27, is cooled to about −195.2° C. This may be accomplished in any suitable manner as for instance by means of an outside source of refrigeration. Once the process is in operation, these temperatures are automatically attained during each cycle.

Considering, therefore, that the packing in heat exchanger 13 is cooled to the desired temperature, reservoir 3 is supplied with a mixture of 40% oxygen and 60% nitrogen gas, and the compressor and cooler 5 is operated. Atmospheric air is drawn into the apparatus through pipe 1 and valve 43. Valve 4 is then adjusted to admit a flow of the 40% oxygen gas into pipe 1 at 2 and enrich the air in oxygen to a point where the air going to the compressor contains approximately 26% oxygen. At 5, the enriched air is compressed to from 1.3 to 5 atmospheres and cooled to about 32° C. Here, also, water, carbon dioxide and other impurities are removed in a conventional manner, and the cooled, clean gas discharged through pipe 6 and valve 7 to heat exchanger 13. For this purpose valve 31 is closed to pipe 9. The gas is cooled in 13 by heat exchange with the cold packing therein and leaves the exchanger through pipe 15 at a temperature of −183.0° C. From the heat exchanger the enriched air passes by way of valve 17, pipe 19, valve 20 and pipe 24, to an expansion engine 25. The expansion engine may be of the usual turbine construction and is provided for the purpose of removing heat from the gas at a low energy level thereby cooling the gas still further. The cold enriched air leaves the expansion engine through pipe 26 and enters the condenser-evaporator at about −189.8° C. and a pressure only slightly above atmospheric. Immediately the air contacts the packing in the condenser-evaporator, which as explained is at a temperature of −195.2° C., there will condense a mixture of liquid oxygen and nitrogen as a thin film on the packing in a zone adjacent the inlet. The evolved heat, due to condensation, immediately raises the temperature of the low heat capacity packing, carrying the film of liquid, to the temperature of the incoming gas, namely −189.8° C. At this temperature the composition of the film will be about 60 mol. % oxygen and the film will be in equilibrium with the 26% oxygen containing gas entering the condenser. In the condensation zone the composition of the gas will drop from 26% $O_2$ on the incoming side to zero percent $O_2$ on the out-going side and only substantially pure nitrogen gas will be discharged at the exit end of the condenser. The composition of the liquid film will vary from zero percent $O_2$ on the outgoing side to 60% $O_2$ on the incoming side. As the cycle progresses the active zone of condensation shown at 46 in Fig. 2 gradually shifts from the inlet end to the exit end of the condenser. Since the temperatures encountered in the condenser are above the boiling point of pure nitrogen only a relatively small quantity of the total nitrogen is condensed to a liquid. The rest of the nitrogen discharges through pipe 29, valve 23, pipe 21, valve 16 and pipe 14, into heat exchanger 12. Since this nitrogen gas is very cold, namely at a temperature of about −192.5° C. it cools the packing in heat-exchanger 12 and finally emerges from the exchanger through pipe 10 at about 29° C. From pipe 10 the nitrogen passes into pipe 8 and then to valve 30 where it is directed to pipe 32 for discharge into the atmosphere or to a storage receptacle, not shown. When the packing in the condenser is substantially completely covered with the film of 60% liquid oxygen, valve 30 is set to discharge through pipe 34 into pipe 36. At this time vacuum pump 37 is started, valve 7 rotated to off position and a vacuum is pulled on condenser 27, the expansion engine, and heat-exchanger 13. The first fraction of gas that distills from the film contains 26% $O_2$. This is discharged by the vacuum pump through pipe 38 and valve 39 into gas holder or reservoir 3. Since the gas contains a smaller percentage of $O_2$ than the liquid, the liquid will tend to become richer in oxygen. As evaporation is continued the vapor pressure of the liquid will become lower and the temperature will drop. At about −193.3° C. approximately 45% of the original oxygen in the liquid will have evaporated and the volume of liquid will be reduced by about 65%. The pressure will have dropped from about 1.0 atm. to 0.3 atm. and the average composition of the gas discharged into reservoir 3 will be about 40% $O_2$. As shown, this gas also passes through heat exchanger 12 where it absorbs heat from the packing and finally emerges through pipe 10 at about 29° C. This gas averaging 40% $O_2$ constitutes the recycle gas in reservoir 3 which is used to enrich the incoming air. When as stated the pressure in the condenser drops to about 0.3 atm. valve 39 is rotated to connect pipe 38 with pipe 42 for discharge into gas holder 40 and evaporation continued until the pressure is reduced to about 0.27 atm. The composition of this later evaporated gas will average 95% $O_2$ and as shown it is collected in gas holder. During the last stages of evaporation of the film of liquid from the condenser-evaporator, the temperature of the packing is reduced to −195.2° C. and the temperature of the packing in heat-exchanger 12 is reduced to about −183.° C.

When the film has been completely removed valve 30 is turned to closed position and valve 7 is rotated to connect pipe 6 with pipe 8. At the time that valve 30 is turned to closed position, valve 16 is rotated to connect pipe 14 with pipe 18 and valve 20 adjusted to connect pipe 18 with pipe 24. Valve 23 is also rotated to connect pipe 29 with pipe 22, valve 17 set to connect pipe 22 with pipe 15 and valve 31 rotated to discharge nitrogen from pipe 9 through pipe 33 to storage not shown or into the atmosphere. Ordinarily many of the valves would be linked together for simultaneous manual or automatic operation. They are shown as separately operable in the present drawings simply for purposes of simplification and clarity.

With the adjustment of the valves as described, enriched air from the compressor and cooler is directed into heat-exchanger 12 where it is cooled as before to about −183.0° C. From 12 the gas is expanded at 25 and subjected to fractional condensation at 27 and evaporated, as before, with substantially pure nitrogen and the products of evaporation being handled in the manner just described. The operation of the heat exchangers is reversed, and the delivery of gaseous products from condenser 27 is controlled by valve 31 instead of valve 30. It is believed the operation of the process during this second half of the cycle will be clear from the above detailed description of the operation of the first half-cycle.

It is believed the process and apparatus of the present invention and the many advantages thereof will be apparent from the detailed description, ante. In addition to the provision of a simple, highly efficient process for the separation of oxygen from air, there is provided a novel arrangement of relatively inexpensive apparatus elements particularly adapted for carrying out the process. While the above description is directed more particularly to preferred embodiments of both the process and apparatus of the present invention it is believed apparent that many changes and modifications may be made, operating with pressure higher or lower than atmospheric and with gas mixtures of other compositions to produce desired fractions, without departing from the spirit of the invention as defined in the following claims.

I claim:

1. The process of separating oxygen from air which comprises cooling the air to the point of incipient condensation, passing the cooled air in a flowing stream into contact with a body of heat exchange material of low heat capacity per unit of surface area, said heat exchange material having an extended surface area and cooled to a temperature below incipient condensation of said air but above the boiling point of nitrogen to condense a liquid in a thin film on said heat exchange material, the heat of said condensation being sufficient to raise the temperature of the heat exchange material to equilibrium temperature with the film and the stream of uncondensed superincumbent air and no additional condensation of liquid occurs, removing the uncondensed superincumbent air and subsequently evaporating said film to obtain a gas richer in oxygen than said air.

2. The subject matter of claim 1, wherein the film is evaporated under reduced pressure and the gases evolved recovered in two fractions, the later recovered fraction containing 95% oxygen.

3. The process of separating oxygen from air which comprises enriching the air to contain not less than approximately 23% oxygen, cooling the enriched air to the point of incipient condensation, passing the cooled enriched air in a flowing stream into contact with a low heat capacity per unit of surface area, heat exchange material having an extended surface area and cooled to a temperature below incipient condensation but above the boiling point of nitrogen to condense a liquid in a thin film on said heat exchange material, the heat of said condensation being sufficient to raise the temperature of the heat exchange material to equilibrium temperature with the film and the stream of uncondensed superincumbent enriched air, removing the uncondensed superincumbent enriched air and subsequently evaporating said film to obtain a gas richer in oxygen than said enriched air.

4. The process of separating oxygen from air which comprises enriching the air in oxygen content, cooling the enriched air to the point of incipient condensation, delivering said enriched air in a flowing stream over the surface of a low heat capacity per unit of cross-sectional area, heat exchange material, said heat exchange material being provided with an extended surface area and precooled to a temperature below incipient condensation of the enriched air but above the boiling point of nitrogen, partially condensing said enriched air, as a thin liquid film on the surface of the heat exchange material, in a transitory zone moving in the direction of the flowing stream, the heat of condensation of the film raising the temperature of the heat exchange material in said zone to the temperature of the enriched air and establishing an equilibrium between the composition of the film and the composition of the enriched air in said zone, continued delivery of the stream of enriched air while withdrawing uncondensed gas from said zone until the zone has substantially transmigrated the entire surface of the heat exchange material, discontinuing delivery of enriched air and evaporating said film to obtain a gas substantially richer in oxygen than said enriched air.

5. The subject matter of claim 4 wherein a portion of the gas evaporated from the film is used to enrich the air in ogygen.

6. The process of separating oxygen from air which comprises enriching the air to contain approximately 26% oxygen, cooling the enriched air to a temperature of —189.8° C., passing the cooled enriched air in a flowing stream into contact with a low heat capacity per unit of surface area, heat exchange material of extended surface area and cooled to a temperature of —195.2° C., to condense a liquid in a thin film on said heat exchange material, said film comprising substantially all of the oxygen in the enriched air and part of the nitrogen and being at equilibrium temperature with the enriched air, removing uncondensed nitrogen, evaporating the film at reduced pressure and collecting a fraction of gas averaging approximately 40% oxygen, continuing evaporation at still further reduced pressure and separately collecting the evolved gas, averaging 95% oxygen, and utilizing the 40% oxygen containing fraction to enrich the incoming air.

7. The subject matter of claim 6 wherein the heat exchange material is selected from the class of metal foil, metal filaments and woven wire metal screen.

8. Apparatus useful for the separation of gaseous materials from each other by condensation and subsequent fractional evaporation which comprises a pair of heat exchangers, an expansion engine, and a combined condenser-evaporator, valved means for delivering gaseous material to said heat exchangers alternately, valved means for alternately discharging gaseous material from the heat exchangers through the expansion engine and into the condenser-evaporator, valved means for discharging gas from the condenser-evaporator into first one and then the other of the heat exchangers and a vacuum pump connected to said heat exchangers for withdrawing gas from the condenser-evaporator through first one and then the other of said heat exchangers.

9. The subject matter of claim 8 wherein the condenser-evaporator contains heat exchange material selected from the class consisting of metal foil, metal filaments or woven wire metal screen.

10. The subject matter of claim 8 wherein the condenser-evaporator contains heat-exchange material of extended surface area but low heat capacity per unit of surface area.

11. The process of separating oxygen from air which comprises cooling the air to the point of incipient condensation, delivering said cooled air in a flowing stream into contact with a body of heat exchange material of low heat capacity per unit of surface area, said heat exchange material having extended surface area and cooled to a temperature below incipient condensation of said air, but above the boiling point of nitrogen to condense a liquid in a thin film on said heat exchange material the heat of condensation being sufficient to raise the temperature of the heat exchange material to equilibrium temperature with the film and uncondensed superincumbent air, removing said uncondensed superincumbent air and subsequently evaporating said film under vacuum to simultaneously obtain a gas richer in oxygen than said air and lower the temperature of the heat exchange material for reuse as before to separate oxygen from the air.

12. The process of separating a high boiling point gas from a gaseous mixture including at least one additional gas of lower boiling point which comprises cooling the gaseous mixture to the point of incipient condensation, delivering said cooled mixture into contact with a body of heat exchange material of low heat capacity per unit of surface area, said heat exchange material having extended surface area and cooled to a temperature below incipient condensation of said mixture but above the boiling point of said lower boiling point gas to condense a liquid in a thin film on said heat exchange material, the heat of condensation being sufficient to raise the temperature of the heat exchange material to equilibrium with the film and uncondensed superincumbent gas, removing said uncondensed superincumbent gas and subsequently evaporating said film under vacuum to obtain a gas richer in high boiling point gas than said mixture.

13. A cyclic process of separating oxygen from air by passage through a series of heat exchangers which comprises cooling the air to the point of incipient condensation by means including passage through a first heat exchange body, subsequently passing said cooled air through a second body of heat exchange material of low heat capacity per unit of surface area said heat exchange material having extended surface area and cooled to a temperature below incipient condensation but above the boiling point of nitrogen to condense a liquid in a thin film on said second body of heat exchange material, the heat of condensation being sufficient to raise the temperature of the heat exchange material to equilibrium temperature with the film and the uncondensed superincumbent air, removing the cold uncondensed superincumbent air, warming said removed cold superincumbent air by heat exchange with a third heat exchange body whereby said third heat exchange body is cooled, evaporating said film under vacuum to obtain a gas richer in oxygen than said air and simultaneously reduce the temperature of the heat exchange material to approximately its temperature before condensation of liquid thereon, further cooling said third heat exchange body by passage of said gas rich in oxygen therethrough and subsequently completing the cycle and obtaining an additional quantity of gas rich in oxygen than said air by reversing the passage of air through said series of heat exchangers.

References Cited in the file of this patent

UNITED STATES PATENTS

| Number | Name | Date |
|---|---|---|
| 1,976,933 | Gobert | Oct. 16, 1934 |